(12) United States Patent
Fischer et al.

(10) Patent No.: US 6,421,979 B1
(45) Date of Patent: Jul. 23, 2002

(54) COMPOSITE CONSTRUCTIONAL ELEMENT

(75) Inventors: Klaus Fischer, Ludwigshafen; Willi Bartholomeyzik, Hassloch, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/659,817

(22) Filed: Sep. 11, 2000

(30) Foreign Application Priority Data

Sep. 16, 1999 (DE) .......................................... 199 44 497

(51) Int. Cl.⁷ ................................................. E04C 2/38
(52) U.S. Cl. ................................ 52/745.19; 52/717.04; 52/730.1; 52/716.7; 52/737.6; 403/363
(58) Field of Search ........................... 52/717.04, 730.1, 52/730.5, 309.2, 309.3, 309.13, 309.15, 489.2, 716.1, 716.6–716.8, 731.6, 736.3, 736.4, 737.6, 738.1, 712; 403/363, 375; 293/120, 121, 110

(56) References Cited

U.S. PATENT DOCUMENTS

| | | | | |
|---|---|---|---|---|
| 1,970,422 A | * | 8/1934 | Foster ........................ 52/726.2 |
| 3,367,809 A | * | 2/1968 | Soloff ........................... 156/73 |
| 4,039,215 A | * | 8/1977 | Minhinnick ............... 293/71 R |
| 4,268,079 A | * | 5/1981 | Nomura et al. ............. 293/120 |
| 5,190,803 A | * | 3/1993 | Goldbach et al. ........... 428/138 |
| 5,860,693 A | * | 1/1999 | Ehrlich ........................ 296/191 |

FOREIGN PATENT DOCUMENTS

| | | |
|---|---|---|
| DE | 1 950 139 | 4/1971 |
| DE | 1 956 826 | 5/1971 |
| DE | 35 28 307 | 2/1987 |
| DE | 36 27 497 | 2/1988 |
| DE | 41 23 459 | 11/1992 |
| EP | 0 370 342 | 5/1990 |
| GB | 2 209 321 | 5/1989 |

\* cited by examiner

Primary Examiner—Beth A. Stephan
Assistant Examiner—Naoko Slack
(74) Attorney, Agent, or Firm—Oblon, Spivak, McClelland, Maier & Neustadt, P.C.

(57) ABSTRACT

A process for producing a composite constructional element from a basic body made of plastic which is provided with ribs and is partially or completely connected to a reinforcing element made of metal or reinforced plastic. In this process, the connection of the basic body and reinforcing element to form the composite constructional element for the transfer of shearing, torsional, flexural and tensile/compressive stresses takes place at a subsequent time in a separate work step.

12 Claims, 4 Drawing Sheets

COMPOSITE CONSTRUCTIONAL ELEMENT

Figure 1:
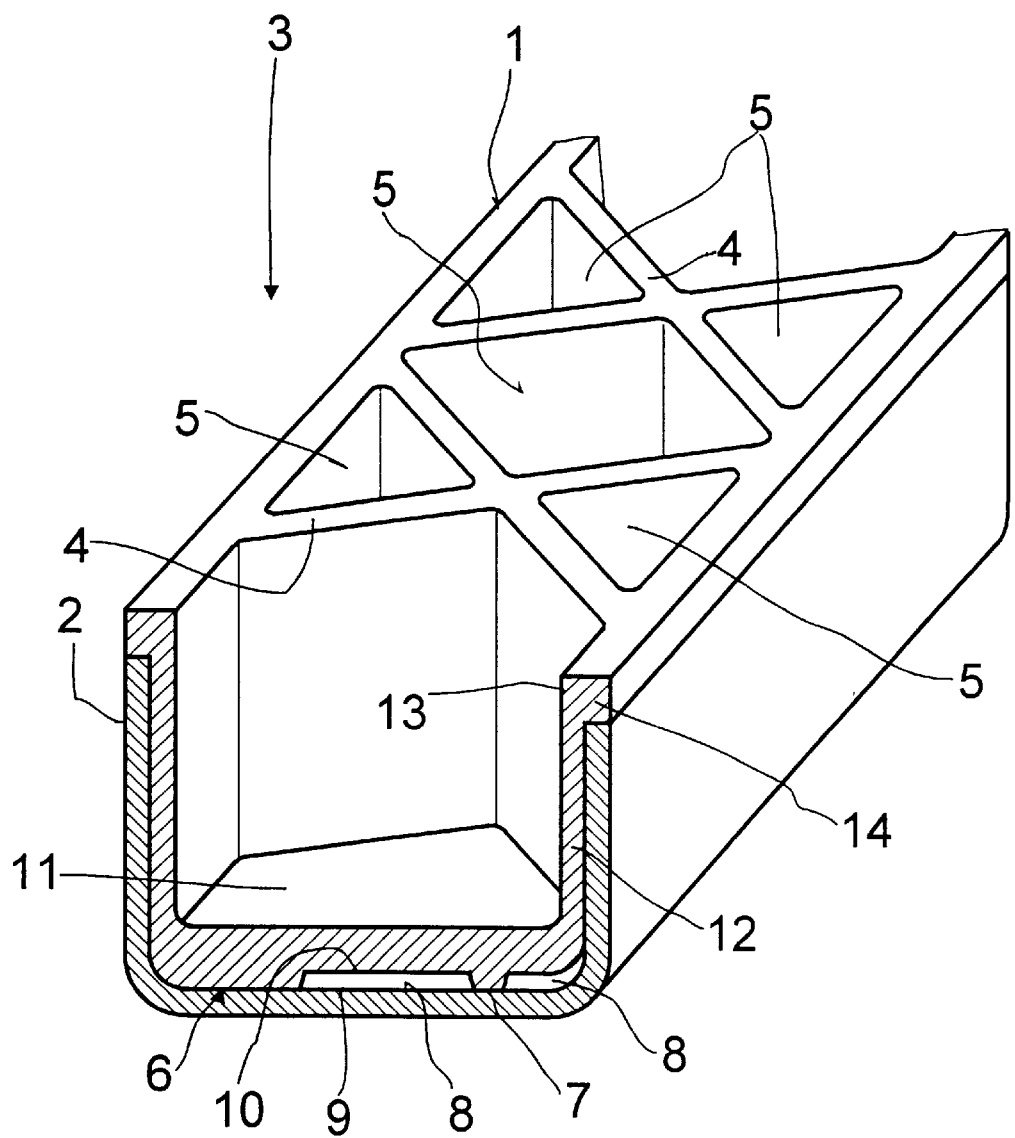

The invention relates to a composite constructional element which comprises in particular a basic body consisting of thermoplastic material and a reinforcing element which can be connected to said basic body, said element being used for example in the automotive industry.

DE-1950 139 relates to an impeller made of plastic. This comprises a hub and blades extending from the latter, the hub being made up of two concentric rings, if appropriate forming an integral part. Cast into the interior is a metal base, which has the form of a cup and is provided in its upright edge with holes through which the polymer melt flows during the injection-molding process. For producing impellers it is possible to use various hub bases, which have shaft bores of various sizes and/or different numbers of holes for the fastening screws, with hole circles of a wide variety of diameters being possible as well as various cup heights, allowing the distance from the clamping plane to the front edge of the blades to be changed.

DE-1956 826 concerns a lightweight plastic beam, in which a reinforced corrugated plastic plate is laminated in a U-shaped upper flange profile and a U-shaped lower flange profile, consisting of reinforced plastic. For absorbing the greatest structural stresses, prestressing reinforcements may be respectively laminated into the flange profiles.

EP-0 370 342 B1 discloses a lightweight constructional element. The lightweight constructional element comprises a shell-shaped basic body, the interior of which has reinforcing ribs. These are permanently connected to the basic body. The reinforcing ribs consist of molded-on plastic, the connection of which to the basic body is effected at discrete connection points by openings in the basic body through which the plastic flows during the injection-molding process. The anchoring means forming the discrete connection points are formed as beads. The basic body of the lightweight constructional element may at least partially have a coating layer which consists of the same material as the reinforcing ribs.

To improve the connection between the reinforcing ribs and the basic body, deformations are provided at the edges of the openings. The reinforcing ribs have at the connection points with the basic body a widened foot region, to achieve improved force introduction. The free spaces formed between the reinforcing ribs on the lightweight constructional element according to EP-0 37 342 B1 have essentially a trapezoidal cross section.

In the case of structures made up of lightweight constructional elements produced in this way and connected to one another, the reinforcing ribs are molded onto the basic body by injection molding and form with the latter a composite constructional element; the reinforcing ribs consisting of plastic and the shell-shaped basic body produced from metal may have different expansion characteristics when subjected to temperature changes, it being possible for this to cause the undesired build-up of stresses at the connection points in the region of the openings on the shell-shaped basic body and on the reinforcing ribs. Since the molding of reinforcing ribs of plastic onto the shell-shaped basic body necessitates very closely toleranced add-on parts for inserting into the open injection mold and requires the simultaneous handling of the metal constructional element and the plastic to be molded on, complex handling mimics and time-consuming operations for positioning the basic bodies in the injection mold are required. This may result in longer cycle times and, seen overall, more expensive production of the constructional elements.

In view of the prior-art solutions presented, it is an object of the present invention to avoid the disadvantages mentioned above and permit more cost-effective production of composite constructional elements with improved longitudinal expansion characteristics.

This object is achieved according to the invention in a process for producing a composite constructional element from a basic body made of plastic which is provided with ribs and is partially or completely connected to a reinforcing element made of metal or reinforced plastic by the connection of the basic body and reinforcing element to form a composite constructional element for the transfer of shearing, torsional, flexural and tensile/compressive stresses taking place at a subsequent time.

The separation, proposed according to the invention, of the simultaneous production and concomitant connection of the basic body and reinforcing element allows the composite constructional element to be produced considerably more easily and cost-effectively. The subsequently occurring operation of connecting two components of different materials makes it possible to produce each component under optimum conditions, so that complexities arising in the simultaneous handling of constructional elements and materials of different properties, and consequently more complex handling, can be avoided.

In a further refinement of the idea underlying the invention, a subsequent connection of the basic body and reinforcing element can be created by means of a material bond. In this way, the inner side of the reinforcing element and the outer side of the basic body can be welded or adhesively bonded to one another either over their full surface area or only partially. Applying a layer of adhesive between the two constructional elements to be connected to one another allows a further layer of material to be created, which for example absorbs shearing stresses and considerably improves the mechanical properties of the composite constructional element.

In addition to the possibility of connecting the basic body and the reinforcing element to one another by a material bond, these two constructional elements can also be connected to one another by a form fit after their production, taking place separately in each case. In this way, openings can be provided on the reinforcing element, which may preferably consist of metal or else reinforced plastic, said openings being capable of being created by cold forming, by the effect of heat or else by vibration, lending the openings an approximately funnel-shaped appearance. When the basic body is pressed together with the reinforcing element, the funnel-shaped regions of the reinforcing element penetrate into the softened thermoplastic of the basic body under the effect of heat or vibration and form a rivet-like connection.

To create a form-fitting connection between the basic body and the reinforcing element essentially sheathing the latter, anchoring attachments into which fastening elements engage, such as for example self-tapping or thread-forming screws, can be molded onto the basic body. A form-fitting connection between the ribbed basic body and the reinforcing element can also be created by rivet pins made of plastic being formed on the basic body, produced by the injection-molding technique, in that, after connecting the basic body and the reinforcing element, the end regions of the rivets passing through the openings on the reinforcing element are re-shaped in a separate operation. A form-fitting connection created in this way between the basic body and the reinforcing element still allows relative movement between the basic body and the reinforcing element when there are longitudinal expansions of the composite constructional element, so that there is no build-up of internal stresses, exerting a load on the constructional element, when it is subjected to temperature changes.

The form-fitting connection on the basic body and on the reinforcing element can be achieved by, for example, butt straps fashioned on the reinforcing element in a certain length being bent around the basic body enclosed for the most part by the reinforcing element. This allows compensation for stresses caused by longitudinal expansion to be brought about in a simple way by a sliding movement, since the relative movement between the two constructional elements is possible without any problems, without significantly impairing the strength of the constructional element.

To achieve a form-fitting connection between the basic body and the reinforcing element, snap elements may also be provided on the basic body, engaging in openings on the reinforcing element or on the basic body which are dimensioned in such a way that it is possible to compensate for thermally induced stresses in a simple way by relative movement at the connection points between the two constructional elements.

A composite constructional element produced according to the variants of the process described above can be produced significantly more cost-effectively, since there is no intervention in the production processes for the individual constructional elements and the joining together of the basic body and reinforcing element only takes place at a subsequent time.

Figure 2:
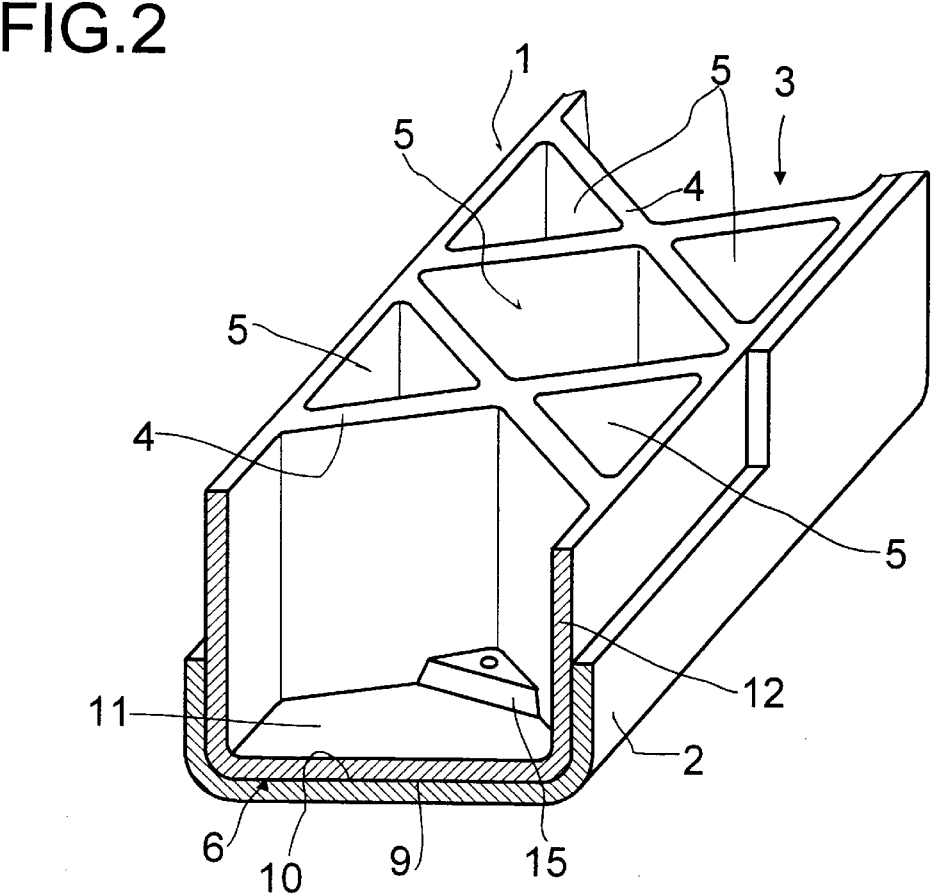
Figure 2A:
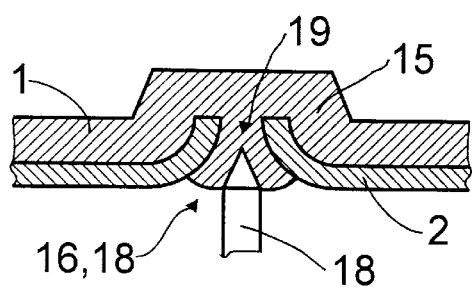
Figure 2B:
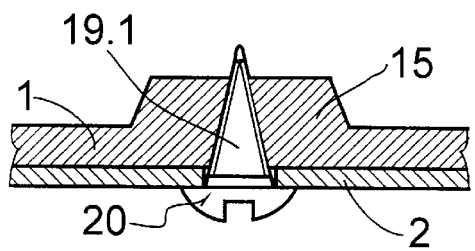
Figure 2C:
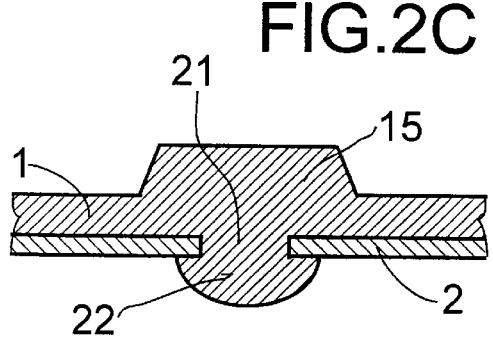
Figure 3:
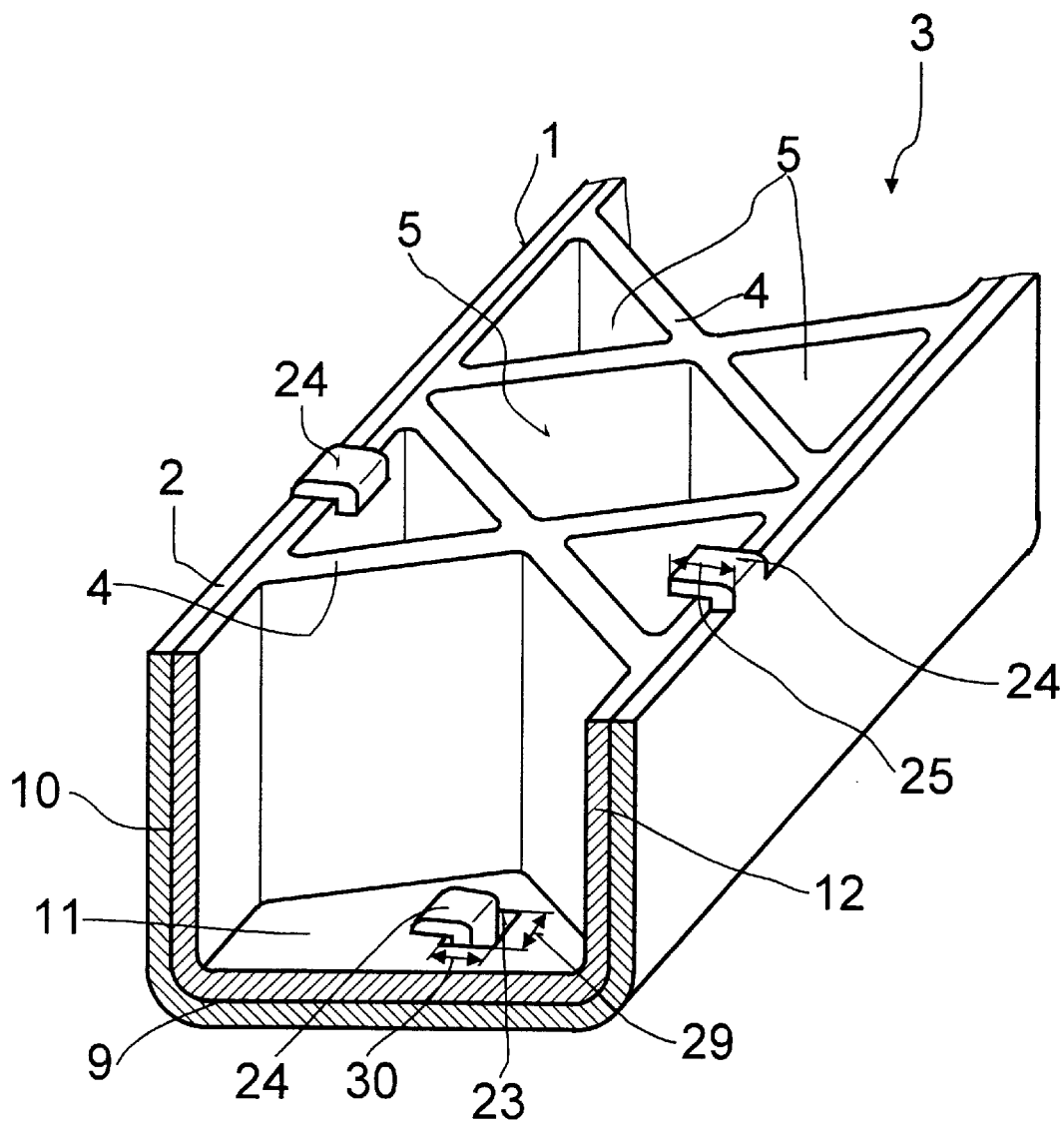
Figure 4:
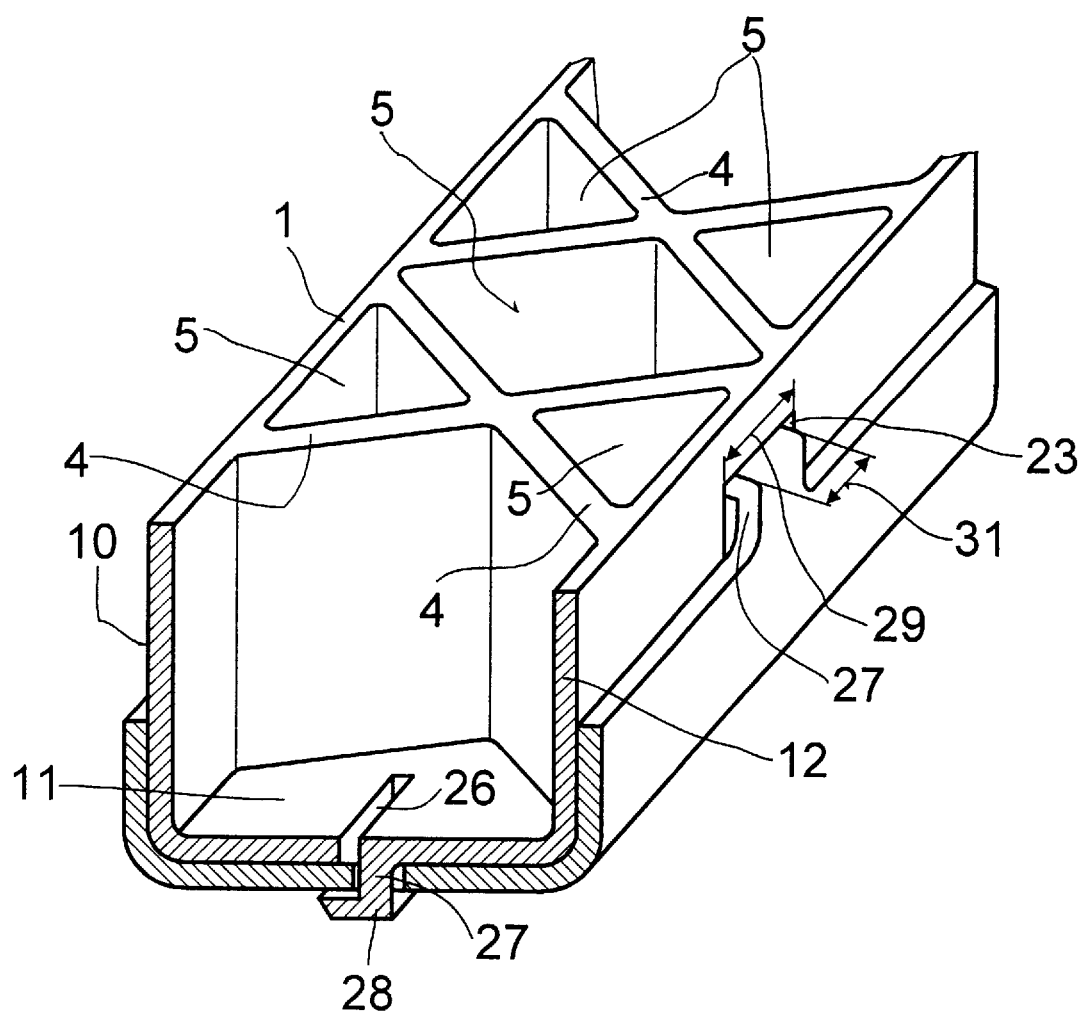

The invention is explained in more detail below with reference to a drawing, in which:

FIG. 1 shows a perspective representation of a composite constructional element with partial or full surface-area adhesive bonding or welding, FIG. 2 shows a perspective representation of a composite constructional element with a molded-on anchoring attachment, FIG. 2a shows a form-fitting press-rivet connection, FIG. 2b shows a form-fitting connection achieved by self-cutting fastening elements, FIG. 2c shows plastic rivets molded onto the basic body, FIG. 3 shows the perspective representation of a composite constructional element with bent-round butt straps, and FIG. 4 shows the perspective representation of a composite constructional element with snap elements produced from plastic or metal.

In the representation according to FIG. 1, a material bond between the basic body and the reinforcing element is represented.

The basic body 1 according to FIG. 1 consists of a thermoplastic amorphous or semi-crystalline material such as, for example, polyamides, polypropylene, polyethylene, polyethylene terephthalate and polybutylene terephthalate, polysulfones, polycarbonate or polystyrene in a reinforced, filled or reinforced form, as well as their copolymers and blends. Thermosetting molding compounds, such as unsaturated polyester resins, vinyl ester resins, epoxy resins and phenolic resins, can also be used application-specifically. These can be modified with customary reinforcing agents and/or fillers. Suitable reinforcing materials are fibers, nonwovens, mats or woven fabrics of glass, carbon, textile or natural substances.

The reinforcing element 2 enclosing the basic body 1 may comprise metal sheets of steel, aluminum, magnesium or titanium or plastic sheets of thermoplastic or thermosetting materials. The basic body 1 may be produced according to the injection-molding, blow-molding, extrusion, flow-molding or thermoforming process. The reinforcing element 2, profiled in a U-shaped form, can be produced in a customary manner by cutting and forming processes.

The basic body 1, likewise profiled in a U-shaped form, between the ribs 4 of which free spaces 5 are provided, is surrounded by the reinforcing element 2, the inner side 9 of the reinforcing element 2 touching the outer side 10 of the basic body 1. The contact between the basic body 1 and the reinforcing element 2 may be effected by a full surface-area material bond or welding, for example in a contact region 6 filled over the full surface area. On the other hand, an only partially formed contact region 7 may also be formed between the contact areas 9 and 10, it being possible for the contact region 7 to be shaped in an approximately linear form or else a punctiform or similar way. The basic body 1 forms in its edge region 13 an overhang 14, with which it rests on the side wall of the reinforcing element 2 profiled in a U-shaped form, and forms a continuous surface apart from the inevitably occurring separating joint.

FIG. 2 shows the perspective view of a composite constructional element 3, the basic body 1 of which is connected by a form fit to the reinforcing element 2.

For this purpose, an anchoring attachment 15, at which the form-fitting connection can be formed in various ways, may be molded on in the base region 11 of the basic body 1. For example, the connection of the basic body 1 and the reinforcing element 2 may be realized by forming funnel-like openings 19 in the reinforcing element 2. The funnel-like openings 19 may be bores; they may be openings formed in a funnel-shaped manner, it being possible for the funnel-shaped contour to be created in the reinforcing element 2 by cold forming. When the constructional elements 1 and 2 are pressed together at their corresponding contact areas 9, 10 according to FIG. 2 in a cold state, under the effect of heat or under vibration, the material of the basic body 1 passing through the funnel-shaped openings 19 can be deformed with the aid of a press-riveting tool 18 in such a way that a form-fitting connection according to FIG. 2a is formed.

FIG. 2b discloses a further configurational variant of a form-fitting connection, in which a fastening element 20 in the form of a self-tapping screw or a thread-forming screw is used. This may bring about a connection between the constructional elements, the basic body 1 and the reinforcing element 2, either from the inside outward or else in the reverse way. For this purpose, bores 19.1 may be provided in the base of the reinforcing element 1. The fastening elements then engage the anchoring attachment 15 molded-on at the base 11 of the basic body 1, so that a force-introduction point of an adequate size is formed at the connection point.

FIG. 2c shows a plastic riveting of the basic body 1 and the reinforcing element 2 enclosing it. Formed on the outer side 9 of the basic body 1 are rivet pins 21, the ends of which are re-shaped into rivet heads 22 by means of a forming tool when the two constructional elements 1 and 2 are riveted to one another. This produces a form-fitting connection between the basic body 1 and the reinforcing element 2, which however is capable of allowing internal stresses in the composite constructional element 3 by relative movement of the basic body 1 in relation to the reinforcing element 2.

FIG. 3 shows the perspectively reproduced view of a composite constructional element with a form-fitting connection permitting compensation for longitudinal expansion, fashioned as a butt-strap connection.

In this configurational variant of a form-fitting connection, butt straps 24, which can be fashioned in a certain length 25, can be formed on the reinforcing element 2. By bending the butt strap length 25 around the edge region 13 of the basic body 1, to be regarded as an insert to be fixed, the bent-round butt straps form the clamps at which the composite constructional element 3 comprising the basic body 1 and the reinforcing element 2 enclosing the latter is held together. The free spaces 5 lying between the ribs 4 permit a bending operation on the butt straps 24. In addition to clamping by the butt-strap length 25 around the basic-body edge 13 of the basic body 1, openings 23, which may have a length 29 exceeding the length of the butt strap 24 and be made somewhat wider than the width of the butt straps 24, can be provided in the base 11 of the basic body 1. The butt straps 24, which according to FIG. 3 partially grip onto the basic-body base 11 of the basic body 1, can allow a relative movement of the basic body 1 in relation to the reinforcing element 2 and consequently bring about compensation for thermally induced stresses in the composite constructional element 3, without the strength of the latter suffering. These stresses are, in particular, different linear expansions of the basic body 1 and reinforcing element 2 influenced and initiated by thermal conditions.

FIG. 4 shows a perspective representation of a composite constructional element with snap elements which consist of plastic or metal, creating form-fitting connections.

In the region of the side walls of the reinforcing element 2 profiled in a U-shaped form and in its base region, the base, the snap elements 27 may be formed with preference. The snap elements 27 engage resiliently in openings 23, which are formed on the basic body 1. It is immaterial whether the snap elements 27 are formed on the basic body 1 or on the reinforcing element 2 embracing the basic body 1; both configurational variants are possible; the corresponding openings 23 are then located respectively on the element of the composite constructional element 3. The openings 23 are formed with a little oversize, as far as their length 29 and their width 30 are concerned. The length 29 of the openings 23 exceeds the length of the butt straps 31, so that the latter can move in relation to the openings 23 and permit relief of thermally induced stresses.

Formed in the base region of the composite constructional element 3 is the projection 28 of the snap elements 27, lying opposite which there is in the base 11 of the basic body 1 a slot 26, permitting the projection 28 to be resiliently compressed.

This configuration of a composite constructional element 3 produced at a subsequent time in a separate joining step also has improved linear expansion characteristics thanks to the snap elements 27 allowing a sliding movement, which in a way similar to the butt straps 24 according to FIG. 3 allow a sliding movement between the basic body 1 and the reinforcing element 2. The composite constructional elements 3 produced by the process according to be invention can be used as heavy-duty components for the automotive industry, such as for example the front end, roof rack, door module, oil sump or cylinder head cover or else as structural components in the office and information sectors. Furthermore, the composite constructional elements 3 may also be used in domestic electric appliances as well as in small and large items of equipment, which together are known as white goods.

LIST OF REFERENCE NUMERALS

1 basic body
2 reinforcing element
3 composite constructional element
4 ribs
5 free space
6 full surface-area contact region
7 partial contact region
8 recess
9 inner side of reinforcing element
10 outer side of basic body
11 basic-body base
12 basic-body side wall
13 basic-body edge
14 overhang
15 anchoring attachment
16 press-rivet connection
17 form-fitting connection
18 press-riveting tool
19 funnel-like opening
19.1 bore
20 screw
21 rivet pin
22 rivet head
23 opening
24 butt strap
25 butt-strap length
26 slot
27 snap element
28 projection
29 opening length
30 opening width
31 butt-strap length

What is claimed is:

1. A process for producing a composite constructional element, said process comprising the steps of:
   forming a basic body which is made of plastic and which is provided with ribs;
   forming a reinforcing element which is either made of metal or reinforced plastic;
   either partially or completely connecting said basic body to said reinforcing element via a connection to form said composite constructional element, said composite constructional element being for transfer of any one of shearing, torsional, flexural, and tensile/compressive stresses, wherein said partially or completely connecting said basic body and said reinforcing element to form said composite constructional element takes place at a time subsequent to said forming of said basic body and said forming of said reinforcing element.

2. The process for producing a composite constructional element as claimed in claim 1, wherein said connection between said basic body and said reinforcing element is effected by means of a material bond.

3. The process for producing a composite constructional element as claimed in claim 2, wherein said connection between said basic body and said reinforcing element is effected by partial or full surface-area welding of contact regions.

4. The process for producing a composite constructional element as claimed in claim 2, wherein said connection between said basic body and said reinforcing element is effected by partial or full surface-area adhesive bonding of contact regions.

5. The process for producing a composite constructional element as claimed in claim 1, wherein said connection between said basic body and said reinforcing element is effected by a form-fitting connection.

6. The process for producing a composite constructional element as claimed in claim 5, wherein said connection between said basic body and said reinforcing element is effected by rivet-like connections, said reinforcing element comprising funnel-shaped openings which penetrate into said basic body in a cold state, under an effect of either heat or vibration.

7. The process for producing a composite constructional element as claimed in claim 6, wherein a material passing through said funnel-shaped openings, when said basic body and said reinforcing element are pressed together, is reshaped.

8. The process for producing a composite constructional element as claimed in claim 6, wherein said funnel-shaped openings are formed on said reinforcing element and further comprising rivet pins which pass through said funnel-shaped openings, said rivet pins being formed on said basic body, and said rivet pins having end regions which are capable of being re-shaped so that said connection between said basic body and said reinforcing element is a form-fitting connection.

9. The process for producing a composite constructional element as claimed in claim 5, wherein said connection between said basic body and said reinforcing element is effected by fastening elements engaging in a molded-on anchoring attachment on said basic body.

10. The process for producing a composite constructional element as claimed in claim 5, wherein said connection between said basic body and said reinforcing element is effected by beaded-over butt straps located either at edges of said basic body and said reinforcing element or at butt-strap accommodating openings.

11. The process for producing a composite constructional element as claimed in claim 5, further comprising snap elements located on either said basic body or said reinforcing element, wherein if said snap elements are located on said basic body, said snap elements resiliently engage either edges of or snap-element openings in said reinforcing element, and wherein if said snap elements are located on said reinforcing element, said snap elements resiliently engage either edges of or snap-element openings in said basic body.

12. A composite constructional element comprising:
    a basic body which is made of plastic and includes ribs;
    a reinforcing element either made of metal or reinforced plastic; and
    a connection between said basic body and said reinforcing element is formed by the process as claimed in claim 1.

\* \* \* \* \*